United States Patent
Perl et al.

(10) Patent No.: US 11,144,186 B2
(45) Date of Patent: Oct. 12, 2021

(54) CONTENT OBJECT LAYERING FOR USER INTERFACES

(71) Applicant: Yahoo Holdings, Inc., Sunnyvale, CA (US)

(72) Inventors: Sophia Thitirat Perl, San Jose, CA (US); Conrad Wai, San Francisco, CA (US); Andrew Wung Yuen Poon, San Francisco, CA (US)

(73) Assignee: VERIZON MEDIA INC., New York, NY (US)

(*) Notice: Subject to any disclaimer, the term of this patent is extended or adjusted under 35 U.S.C. 154(b) by 121 days.

(21) Appl. No.: 15/797,279

(22) Filed: Oct. 30, 2017

(65) Prior Publication Data

US 2019/0129595 A1    May 2, 2019

(51) Int. Cl.
| | |
|---|---|
| *G06F 3/048* | (2013.01) |
| *G06F 3/0485* | (2013.01) |
| *G06F 3/0488* | (2013.01) |
| *G06F 3/0481* | (2013.01) |
| *G06F 3/0484* | (2013.01) |
| *G06T 13/80* | (2011.01) |
| *G06T 3/20* | (2006.01) |

(52) U.S. Cl.
CPC ........ *G06F 3/0485* (2013.01); *G06F 3/04815* (2013.01); *G06F 3/04842* (2013.01); *G06F 3/04883* (2013.01); *G06T 3/20* (2013.01); *G06T 13/80* (2013.01); *G06T 2200/24* (2013.01)

(58) Field of Classification Search
CPC ..... G06F 3/0485; G06F 3/04883; G06T 3/20; G06T 13/80; G06T 2200/24
See application file for complete search history.

(56) References Cited

U.S. PATENT DOCUMENTS

| | | | |
|---|---|---|---|
| 9,658,739 B1* | 5/2017 | Freund | G06F 3/04817 |
| 2003/0001898 A1* | 1/2003 | Bernhardson | G06F 3/0481 |
| | | | 715/786 |
| 2005/0097008 A1* | 5/2005 | Ehring | G06Q 30/02 |
| | | | 715/205 |
| 2006/0271531 A1* | 11/2006 | O'Clair | G06Q 30/0205 |
| 2008/0165161 A1* | 7/2008 | Platzer | G06F 1/1616 |
| | | | 345/177 |
| 2010/0211872 A1* | 8/2010 | Rolston | G06F 9/451 |
| | | | 715/702 |
| 2011/0126156 A1* | 5/2011 | Krishnaraj | G06F 3/04842 |
| | | | 715/828 |
| 2011/0296351 A1* | 12/2011 | Ewing, Jr. | G06F 3/0483 |
| | | | 715/841 |

(Continued)

*Primary Examiner* — Pei Yong Weng
(74) *Attorney, Agent, or Firm* — Cooper Legal Group LLC

(57) ABSTRACT

One or more computing devices, systems, and/or methods for layering content objects for a user interface are provided. For example, a z-axis is defined for the user interface. A set of layers are defined along positions of the z-axis. Content objects, such as images, text, or other user interface elements, are ranked and assigned to layers based upon such ranks. The user interface is rendered on a display of a computing device, such that content objects of layers below a current layer are not displayed. In response to receiving user input for a currently displayed content object, the user interface is modified to display content objects of a layer that is below the current layer along the z-axis.

20 Claims, 16 Drawing Sheets

(56) References Cited

U.S. PATENT DOCUMENTS

| | | | |
|---|---|---|---|
| 2015/0112963 A1* | 4/2015 | Mojtahedi | G06F 16/9537 707/711 |
| 2015/0186346 A1* | 7/2015 | Mesguich Havilio | G06F 3/04842 715/256 |
| 2016/0026253 A1* | 1/2016 | Bradski | H04N 13/344 345/8 |

* cited by examiner

CONTENT OBJECT LAYERING FOR USER INTERFACES

BACKGROUND

User interfaces are rendered on two-dimensional displays of devices. In one example, a web browser is rendered on a mobile device so that a user can view and interact with content available over a network. In another example, a map application is rendered on a tablet so that a user can view locations depicted within the map application. In this way, users can view and interact with content objects, such as user interface elements (e.g., an image, text, a text entry box, etc.), populated within user interfaces in a two-dimensional manner.

Because of the relatively small form factor of mobile device displays, a limited amount of information can be conveyed through a user interface at any given moment. The user interface may allow a user to scroll in two-dimensional space such as along an x-axis and a y-axis. In this way, the user interface can be updated with content objects along the x-axis and the y-axis. However, navigating between content objects in two-dimensional space can still be inadequate for displaying the necessary amount of information desired by a user. For example, the user may be planning a trip on a mobile device, and thus the user may seek information relating to flights, renting a vehicle, hotels, activities, etc. The user would be unable to view all of this content together on the small form factor of a display of the mobile device. The ability to display information sought by a user becomes increasingly challenging as displays become smaller, such as with mobile devices, smart watches, and other wearable devices.

SUMMARY

In accordance with the present disclosure, one or more computing devices and/or methods for layering content objects for a user interface are provided. In particular, a z-axis is defined for the user interface. The z-axis may be defined according to a three-dimensional Cartesian coordinate system also having an x-axis and a y-axis, where the z-axis is perpendicular to the x-axis and the y-axis. In one example, the z-axis may be defined such that when the user interface is rendered on a display of a computing device, the x-axis runs horizontally along the display, the y-axis runs vertically along the display, and the z-axis runs into and out of the display (e.g., towards and away from a user holding the computing device). A set of layers are defined along the z-axis. A layer may comprise a user interface element (e.g., a container user interface element) within which content objects, such as images, text, hyperlinks, etc. can be populated. The set of layers are ordered as a stack of layers from a top layer to a bottom layer at positions along the z-axis.

Content objects, such as text, images, user interface elements, and/or other content, may be ranked for assignment to layers based upon display criteria defining an ordering for which content objects are to be displayed. In one example, the display criteria may specify that the more a topic of a content object relates to a context of the user interface, then the higher the content object should be ranked. For example, a map user interface may display a map of a downtown area populated with locational markers of pizza shops based upon a user searching for pizza shops. Content objects relating to pizza and food may be ranked higher than content object relating to movie theaters. It may be appreciated that various types of display criteria can be used to rank and order content objects, such as a proximity of a location represented by a content object to a current location of the computing device, a predefined ordering for particular content objects, a time of day (e.g., certain types of content objects such as breakfast restaurant suggestions may be ranked higher during the morning than the evening), etc.

Content objects are assigned to layers according to an ordering derived from ranks assigned to the content objects, such as where higher ranked content objects are assigned to layers that will be displayed before other layers (e.g., a highest ranked content object is assigned to a top layer, a second highest ranked content object is assigned to a second from the top layer, etc.). The user interface is rendered on the display of the computing device. Content objects of a current layer (e.g., the top layer) may be displayed, while content objects of layers below the current layer are not displayed.

In response to receiving user input, the user interface is modified to display content objects within a layer positioned below the current layer along the z-axis (e.g., a layer directly below the current layer and adjacent to the current layer along the z-axis without any intervening layers between the layer and the current layer). For example, the user input may comprise a gesture on a touch display, such as a swipe gesture to displace a currently displayed content object (e.g., the user may swipe across one or more images in a horizontal direction in order to scroll an image out of view of the user interface and scroll a different image into view of the user interface). As the currently displayed content object is displaced, a content object within the layer below the current layer is display (e.g., visual navigation along the z-axis from the current layer to the layer below the current layer). In this way, subsequent user input can be used to visually traverse down through the set of layers along the z-axis to reveal content objects of such layers.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
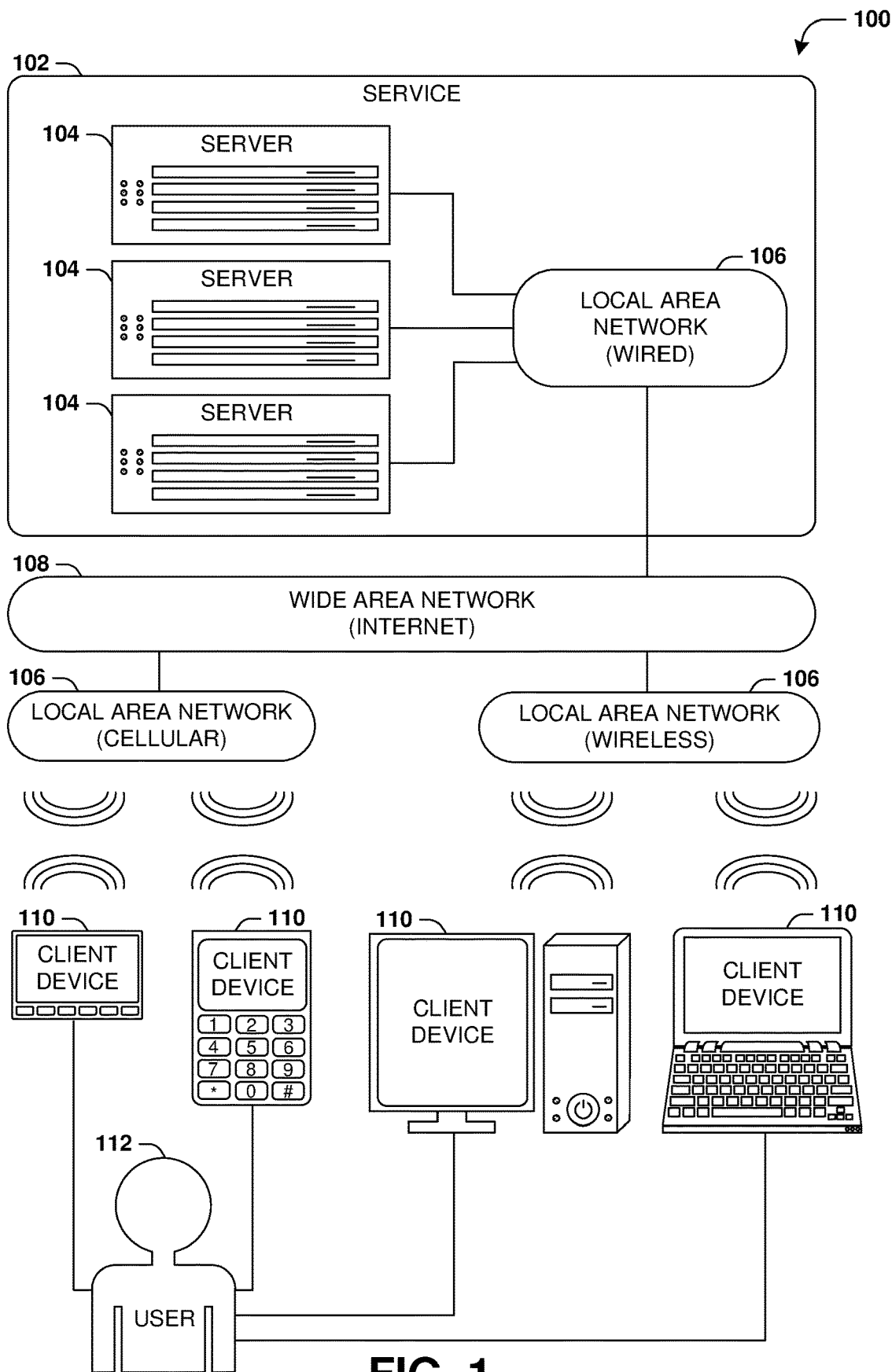
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
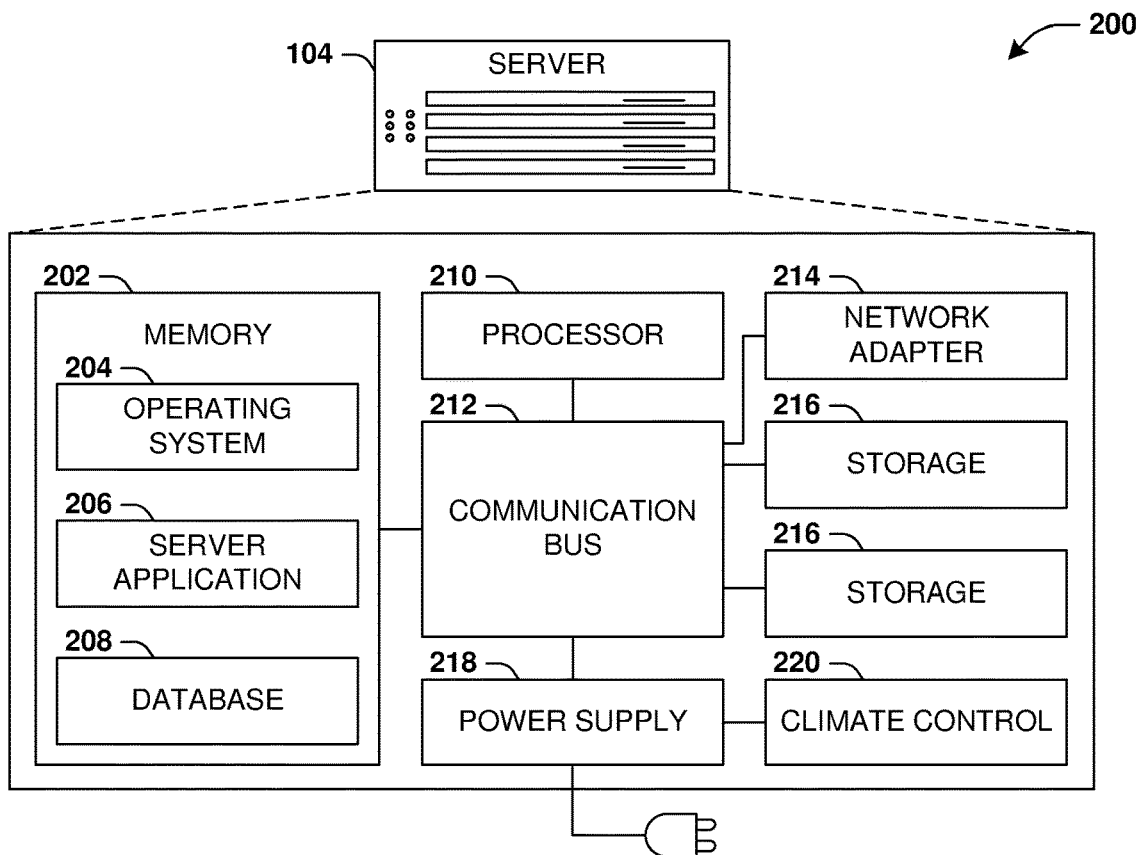
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
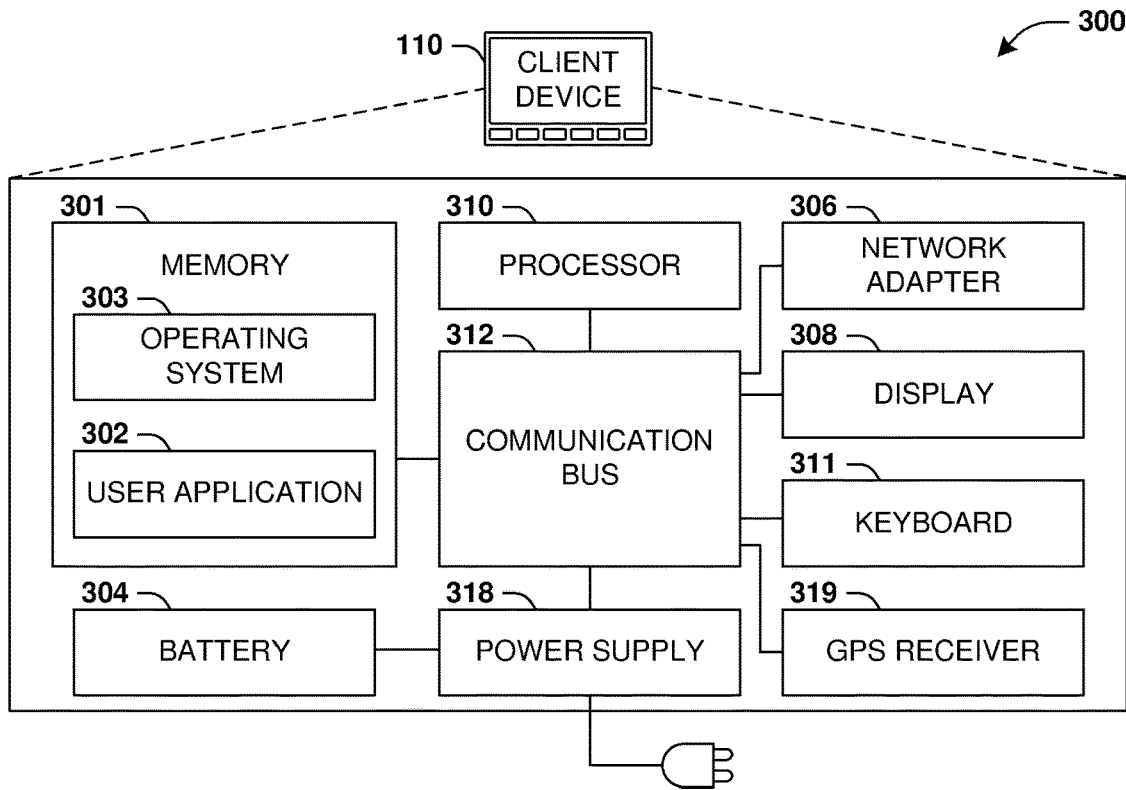
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for layering content objects for a user interface are provided. Multi-dimensional layering and ordering of content objects provides a technical solution to a technical problem relating to the inability to display adequate amounts of information within small form factor displays of mobile devices, such as phones, tablets, smart glasses, smart watches, and/or other mobile or wearable computing devices. As opposed to merely swiping/scrolling through content in a two-dimensional plane (e.g., horizontal or vertical swipes to scroll through content objects), content objects can also be navigated between along a z-axis through a layering mechanism provided herein. In this way, content objects may be revealed to a user along multiple dimensions of a user interface to provide for an improved user experience such as with small form factor displays. The user experience is improved because users can now visually navigate between more information by navigating amongst content objects along not just an x-axis and a y-axis but also the z-axis. The techniques described herein provide an improved way for users to interact with content.

Figure 4:
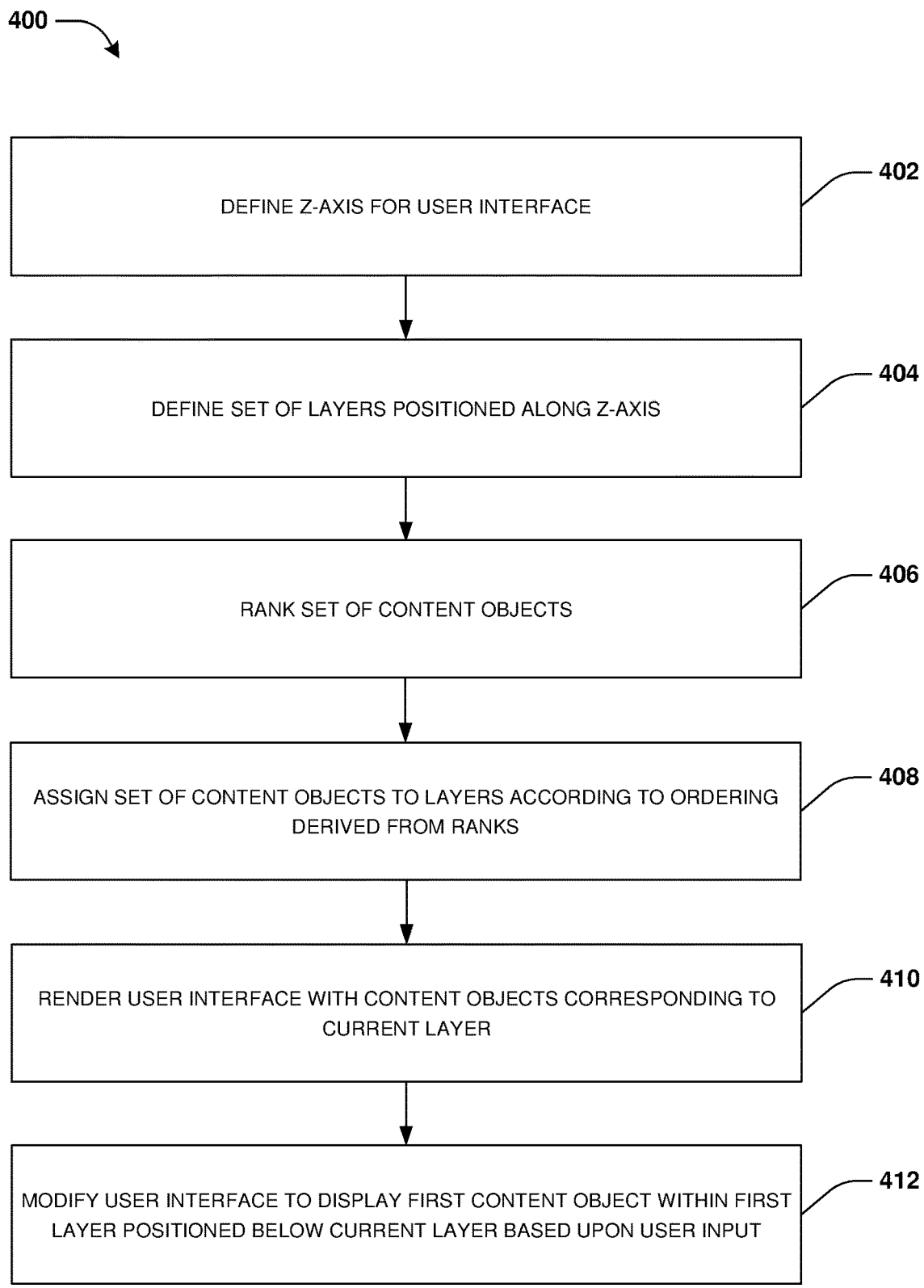
FIG. 4 is a flow chart illustrating an example method for layering content objects for a user interface.

An embodiment of layering content objects for a user interface is illustrated by an example method 400 of FIG. 4. In one example, a user interface may comprise a videogame user interface through which a user can browse and interact with videogame reviews, videogame screenshots, and/or other content objects that are native to the videogame user interface. The videogame user interface may natively allow the user to scroll through content objects in two-dimensional space, such as horizontally scrolling through videogame screenshots within a horizontal scroll interface and/or vertically scrolling through videogame reviews through a vertical scroll interface. However, the videogame user interface may not natively support scrolling in other dimensions. Accordingly, a z-axis is defined for the user interface, at 402. The z-axis may be perpendicular to an x-axis running horizontally along the videogame user interface and a y-axis running vertical along the videogame user interface. Thus, the z-axis may run into and out of the videogame user interface.

At 404, a set of layers are defined along positions of the z-axis. The number of layers may be predefined or may be dynamically determined based upon various factors, such as a number of content objects that are to be displayed along the z-axis, network bandwidth (e.g., less layers may be defined for a website accessed over a network when a computing device requesting the website has low network bandwidth or a remaining amount of a data plan below a threshold), etc. In one example, the set of layers comprises a top layer that is the native user interface of the videogame user interface (e.g., the user interface that is normally displayed without the techniques described herein). In another example, the set of layers does not comprise the native user interface of the videogame user interface, and thus the set of layers comprise layers below the native user interface of the videogame user interface (e.g., the native user interface may be positioned at an origin of the z-axis, while layers of the set of layers are positioned at locations along the z-axis other than the origin).

A bottom layer can be defined for the z-axis below the set of layers or as a last layer of the set of layers. In one example, the bottom layer is static, and thus user input while the bottom layer is rendered does not trigger the modification of the videogame user interface to transition from displaying content objects of the bottom layer to displaying content objects of a different layer. In another example, the bottom layer is not static, and thus user input while the bottom layer is rendered does trigger the modification of the videogame user interface to transition from displaying content objects of the bottom layer to displaying content objects of a different layer, such as a layer just above the bottom layer (e.g., traversal back up through the set of layers towards the origin of the z-axis) or a top/first layer of the set of layers (e.g., looping back through down the layers).

At 406, a set of content objects may be ranked based upon display criteria defining an ordering for which content objects are to be displayed. In one example, the display criteria comprises a predefined order for content objects. In another example, the display criteria assigns higher ranks to content objects with topics that more closely match a current context of the videogame user interface (e.g., if the user is viewing reviews of videogames for a first type of videogame system, then content objects associated with the first type of videogame system may be ranked higher than content objects for a second type of videogame system). Various classification and topic extraction techniques may be used to identify topics of content objects and the context of the videogame user interface, such as to analyze text (e.g., key word extraction and semantic analysis), images (e.g., feature recognition), and/or metadata.

In another example, the display criteria may assign higher or lower ranks to certain types of content objects or content objects having certain topics based upon temporal information (e.g., certain topics may be more relevant to users at certain times of day than other times of day). In another example, the display criteria may assign ranks to content objects based upon whether content objects are permanent content objects (e.g., an image that does not lose it relevancy over a period of time) or transient content objects (e.g., an image relating to an event occurring today, which may be less relevant after today). If the bottom layer is static, then ranks may be assigned to permanent content objects such that the permanent content objects are assigned to the bottom layer. Thus, once the bottom layer is reached, the permanent content objects are not swapped for other content objects in response to user input.

In one example, content objects may be ranked for ordered display along the z-axis, the x-axis, and/or the y-axis. This provides for multi-dimensional ordering of content objects for visual navigation through the user interface based upon various user input.

At 408, content objects within the set of content objects are assigned to layers of the set of layers according to an ordering derived from ranks assigned to the content objects (e.g., a highest ranked content object is assigned to a top layer, a second highest ranked content object is assigned to a layer just below the top layer, etc.). In one example, merely one content object is assigned to a layer. In another example, more than one content object can be assigned to a layer (e.g., content objects of the same or different type, such as text, an image, a hyperlink, a create calendar entry command interface, a post to social network command interface, a send email command interface, a video, and/or any other type of content or combination thereof). For example, a videogame controller image is assigned to a first layer, a social link to a videogame manufacturer social network profile is assigned to a second layer, etc.

At 410, the user interface is rendered on the display of the computing device. In one example, the videogame user interface is populated with content objects of a videogame website, such as the vertical scroll interface populated with videogame reviews, the horizontal scroll interface populated with videogame screenshots, a background, a title, buttons linking to other web pages of the videogame website, and/or other content objects or user interface elements natively part of the videogame website. In one example, the videogame user interface is initially rendered without a current layer from the set of layers being active. In another example, the videogame user interface is initially rendered with a current layer comprising the content objects native to the videogame website. Content objects within layers below the current layer are not displayed (e.g., if the videogame user interface is initially rendered without an active current layer, then no content objects assigned to layers are initially displayed).

At 412, user input within the user interface is received. The user input is evaluated to determine whether the user input triggers the transition from the currently layer to a next lower layer along the z-axis (e.g., whether to trigger navigation between layers of content objects in the z-axis direction/dimension). The user input may correspond to a currently displayed content object (e.g., a drag and drop command, a touch gesture, a swipe gesture, a voice command, a mouse command, etc.). In one example, the user input displaces the currently displayed content object, such as scrolling the currently displayed content object or moving the currently displayed content object from a current position within the videogame user interface to a different position.

Various triggers such as user input can be defined for when to transition from displaying content objects of one layer to content objects of the next lower layer (e.g., a layer further from the origin of the z-axis than the current layer). For example, user input may trigger the transition when the user input moves the currently displayed content object beyond a predetermined position within the videogame user interface (e.g., scrolling a user interface element a certain number of pixels or distance to the left of the display). The user input may trigger the transition when the user input moves the currently displayed content object outside a region of the videogame user interface (e.g., a square, rectangle, circle, or other shaped region may be defined within a user interface such that when a user interface element is moved outside the region, the transition is triggered). The user input may trigger the transition when the user input moves the currently displayed content a threshold distance from an initial position within the videogame interface (e.g., when a user interface element is moved a certain number of pixels in any direction from an initial position). The user input may trigger the transition when the user input moves the currently displayed content over a current trigger location within the videogame user interface (e.g., a trigger point or region may be defined such that when a user interface element is moved into/over the trigger point or region, the transition is triggered). In this way, content objects in a lower layer are revealed after a content object in a foreground has passed over the predetermined position or upon occurrence of some other trigger.

In response to the user input triggering the transition, the user interface is modified to render/display content objects within a layer positioned below the current layer along the z-axis (e.g., or a top layer of the set of layers if there is no current layer being displayed). In one example, the set of layers corresponds to merely a region of the videogame user interface (e.g., a region associated with a horizontal and vertical position). Thus, the content objects of the layer are displayed within the region without disturbing other content objects of the videogame user interface (e.g., native user interface elements and content objects of the videogame user interface not positioned within or over the region are not modified or affected, such as the title of the videogame website, the links of the videogame website, etc.). Content objects within the region may be replaced with the content objects of the layer positioned below the current layer. For example, in response to the user input comprising a touch gesture displacing a currently displayed content object away from the horizontal and vertical position, the transition is triggered.

In one example of rendering the user interface and transitioning the user interface between displaying content from various layers along the z-axis based upon user input, the user interface may corresponds to a rendering of an augmented reality experience provided by a computing device, such as smart glasses. The z-axis may correspond to the user's perception of depth within an environment for which the augmented reality is being provided. Various triggers may be associated with transitioning between layers of content objects through the augmented reality experience, such as a current distance of a user to a real life object, user interaction with an augmented reality content object, etc.

In one example, the user input may additionally trigger the modification of other user interfaces. For example, a map user interface may also be displayed. Upon modifying the videogame user interface to display a videogame store description within the layer positioned below the current layer, a location marker for a corresponding videogame store may be populated within the map user interface.

Subsequent user action with currently displayed content objects (e.g., with native user interface elements and content objects of the videogame website or content objects within a layer currently being displayed) can trigger the transition/navigation between various layers of the z-axis. In an example where the videogame user interface was transitioned to display content objects of a first layer of the set of layers, second user input may be received for a currently displayed content object (e.g., a native content object of the videogame website or a content object within the first layer). Accordingly, the user interface may be modified to display content objects within a second layer positioned below the first layer along the z-axis. Display of the content objects within the first layer may be replaced with the display of content objects within the second layer.

In one example, multiple sets of layers can be defined and positioned along the z-axis at different positions within the user interface. For example, the set of layers may be positioned at a first horizontal and vertical position or region within the videogame user interface, such as proximate to the vertical scroll interface such that user input vertically scrolling through content objects within the vertical scroll interface can trigger the visual navigation between content objects within the set of layers. A second set of layers may be positioned at a second horizontal and vertical position or region within the videogame user interface, such as proximate to the horizontal scroll interface such that user input horizontally scrolling through content objects within the horizontal scroll interface can trigger the visual navigation between content objects within the second set of layers. For example, user input displacing a currently displayed content object away from the first horizontal and vertical position or region may trigger the transition of the videogame user interface to display content objects of a layer below the current layer of the set of layers. User input displacing a currently displayed content object away from the second horizontal and vertical position or region may trigger the transition of the videogame user interface to display content objects of a layer below the current layer of the second set of layers.

In one example, a content object of a layer may comprise a front side populated with first content and a back side populated with second content (e.g., a content object representing a virtual card and a set of layers representing a stack of cards). When a user interface is transitioned to the layer, the first content of the front side of the content object may be displayed while the second content of the back side of the content object and content objects within layers positioned below the layer along the z-axis are not displayed. Upon receiving first user input for the content object, the content object may be flipped to display the second content of the back side of the content object while the first content of the front side of the content object and content objects within layers positioned below the layer along the z-axis are not displayed after the flip. In one example, a flip animation of the content object may be performed to visually flip the content object. During the flip animation such as while a side edge of the content object is being displayed, a content object within a layer below the layer may be displayed (e.g., temporarily revealed until completion of the flip animation). Subsequent user input with a currently displayed content object may trigger the transition from displaying the content object of the layer (e.g., displaying the second content of the back side of the content object) to displaying the content layer within the layer below the layer (e.g., displaying a front second of a content object within the layer below the layer).

Figure 5A:
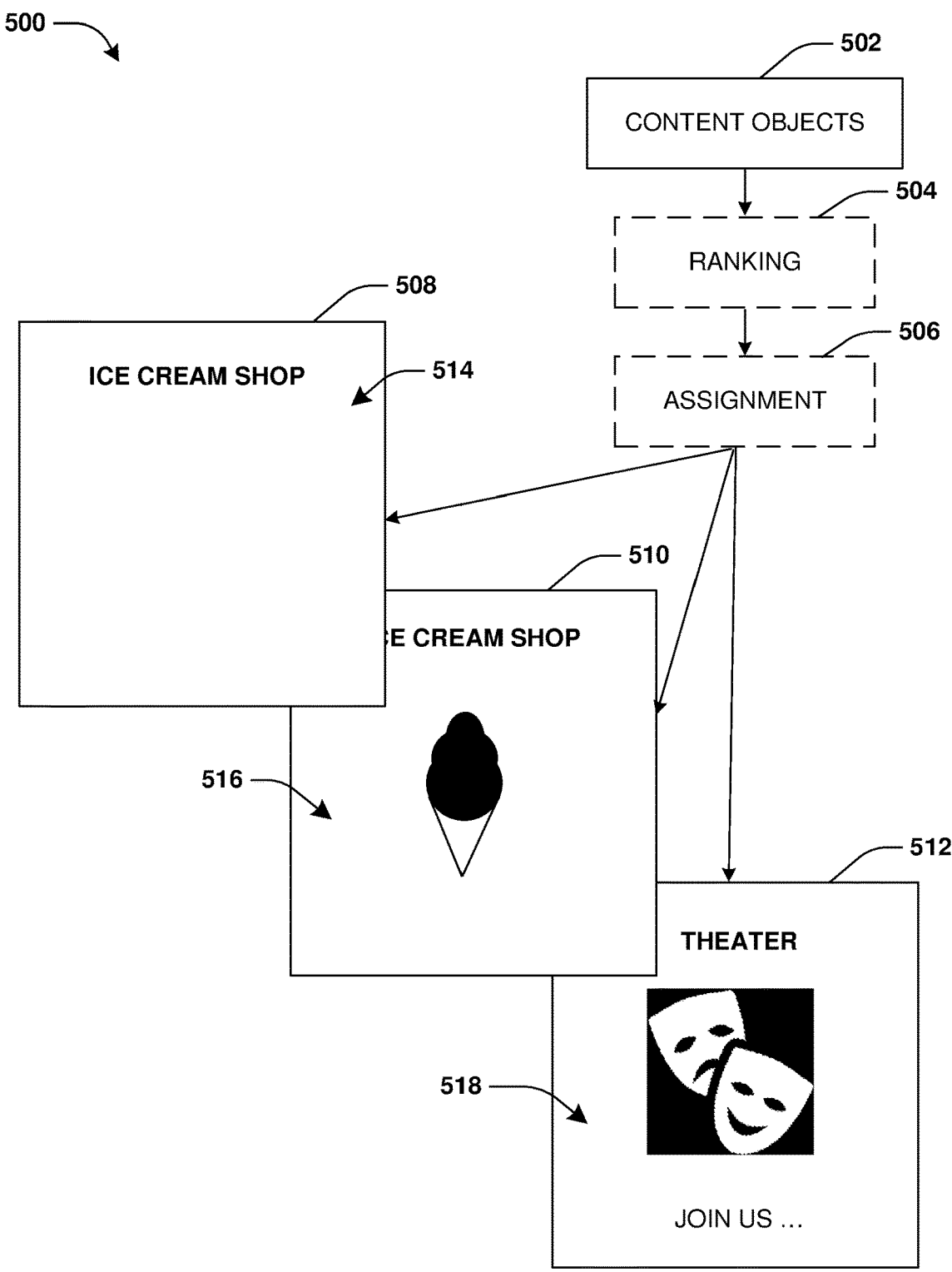
FIG. 5A is a component block diagram illustrating an example system for layering content objects for a user interface.

FIGS. 5A-5E illustrate an example of a system 500 for layering content objects for a user interface. FIG. 5A illustrates content objects 502 being ranked 504 based upon display criteria. For example, a context of a user interface that is to be displayed may be determined as relating to a map populated with locations of coffee shops. The context may be used by the display criteria to rank the content objects 502, such as an ice cream shop content object 514, an ice cream shop image content object 516, a theater content object 518, and/or other content objects. Topics of the content objects 502 may be determined (e.g., extracted from metadata, identified using semantic analysis and topic classification functionality, identified using image analysis, feature extraction, and topic classification functionality, etc.).

The topics may be compared with the context in order to rank 504 each content object based upon how similar topics are to the context (e.g., higher ranks may be assigned to content objects having topics more similar to the context of the user interface). For example, a highest rank may be assigned to the ice cream shop content object 514, a second highest rank may be assigned to the ice cream shop image content object 516, a third highest rank may be assigned to the theater content object 518, etc. In this way, the content objects 502 are assigned to layers of a set of layers based up rankings. For example, the ice cream shop content object 514 is assigned 506 to a first layer 508, the ice cream shop image content object 516 is assigned 506 to a second layer 510, the theater content object 518 is assigned 506 to a third layer 512, etc. The set of layers may be assigned to a horizontal and vertical position within the user interface, such as a bottom right corner of the user interface. The horizontal and vertical position may correspond to a point within the user interface or a region within the user interface.

Figure 5B:
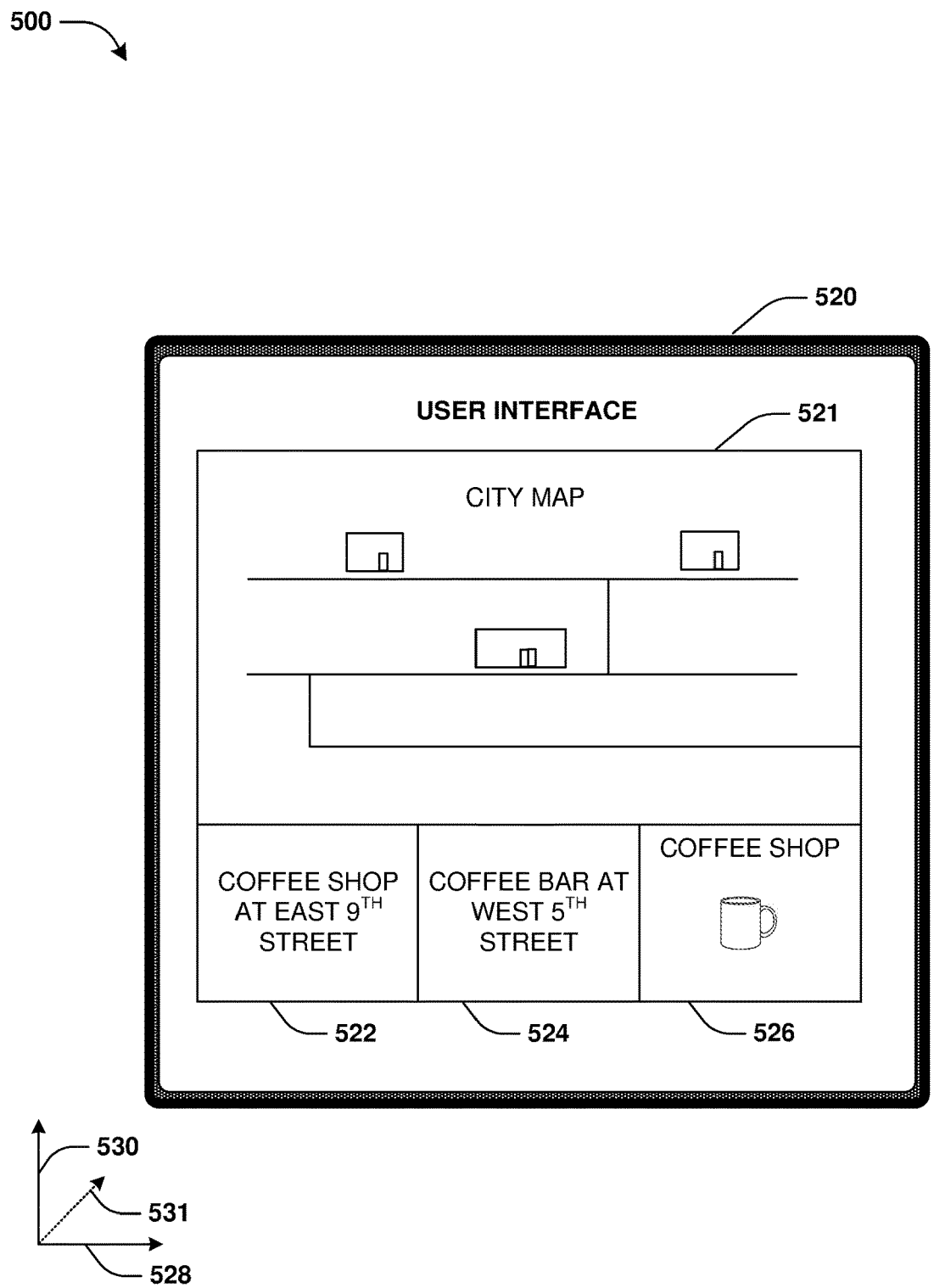
FIG. 5B is a component block diagram illustrating an example system for layering content objects for a user interface, where the user interface is rendered.

FIG. 5B illustrates the user interface being rendered through a display of a computing device 520. The user interface may be rendered with native user interface elements, such as a city map 521, a first search result 522, a second search result 524, and a third search result 526 for a query "coffee shops" submitted through the user interface. These native user interface elements may be referred to as currently displayed content objects because the native user interface elements are currently rendered and displayed through the display. The user interface may be associated with an x-axis 528 (e.g., a horizontal axis running horizontally along the user interface) and a y-axis 530 (e.g., a vertical axis running vertically along the user interface). A z-axis 531 may be defined for the user interface. The z-axis 531 may run into and out of the user interface and display. The search results may be displayed within a horizontal scroll interface along the x-axis 528 so that a user can scroll amongst the search results with left and right swipe gestures or other input.

Figure 5C:
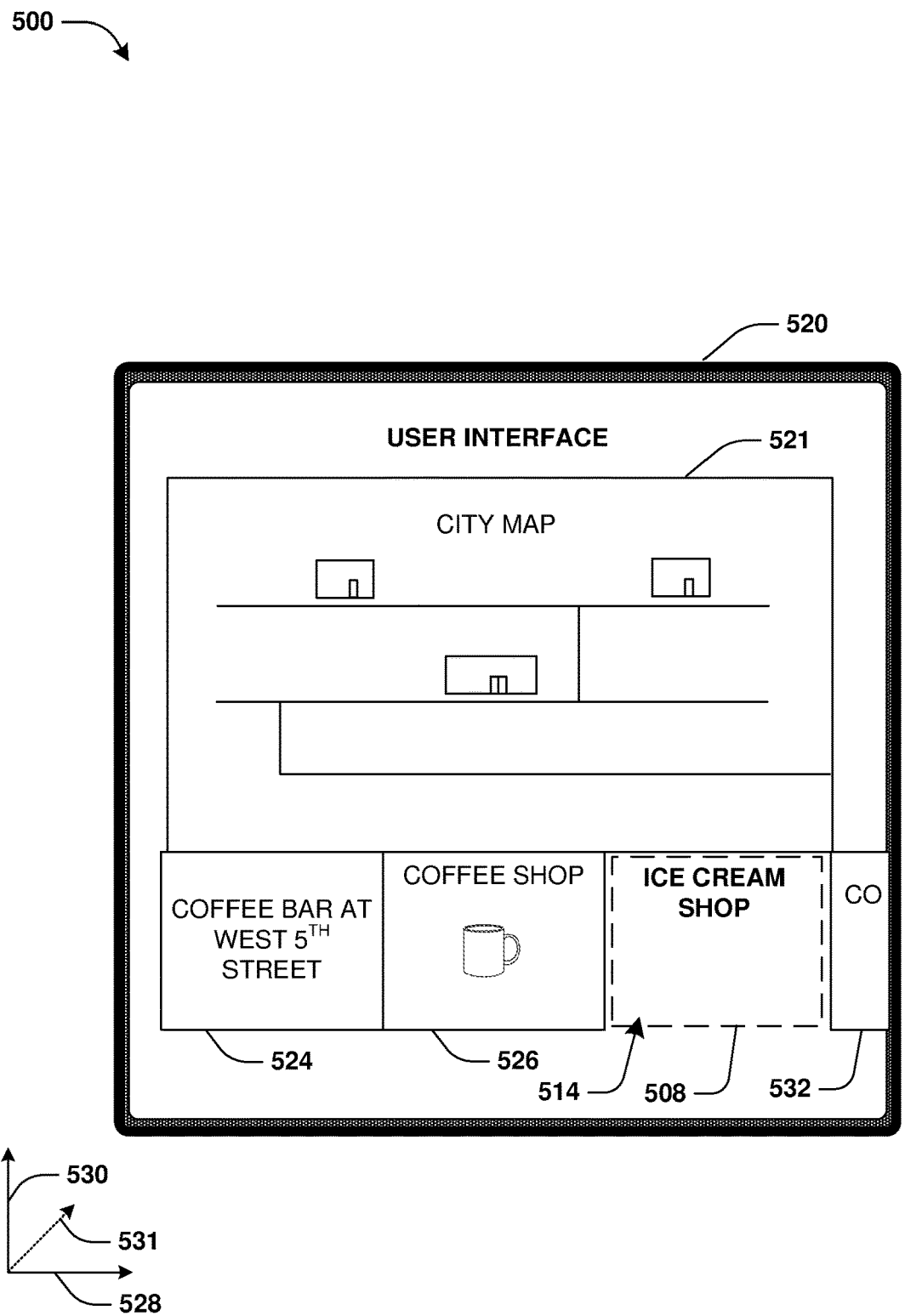
FIG. 5C is a component block diagram illustrating an example system for layering content objects for a user interface, where a first content object is rendered.

FIG. 5C illustrates a first user input displacing the first search result 522, the second search result 524, and the third search result 526. For example, a user may swipe from right to left across the display along the x-axis 528 to move the first search result 522, the second search result 524, and the third search result 526 to the left. A determination may be made that the first user input triggers the transition of the user interface to display the ice cream shop content object 514 of the first layer 508 at the horizontal and vertical position to which the set of layers is assigned, such as the bottom right corner of the user interface. The first user input may trigger the transition based upon the first user input displacing the first search result 522, the second search result 524, and/or the third search result 526 a threshold distance from the horizontal and vertical position (e.g., user input that moves search results outside of the horizontal and vertical position). In this way, the ice cream shop content object 514 is rendered at the horizontal and vertical position based upon navigation along the z-axis 531 from a current layer to the first layer 508.

Figure 5D:
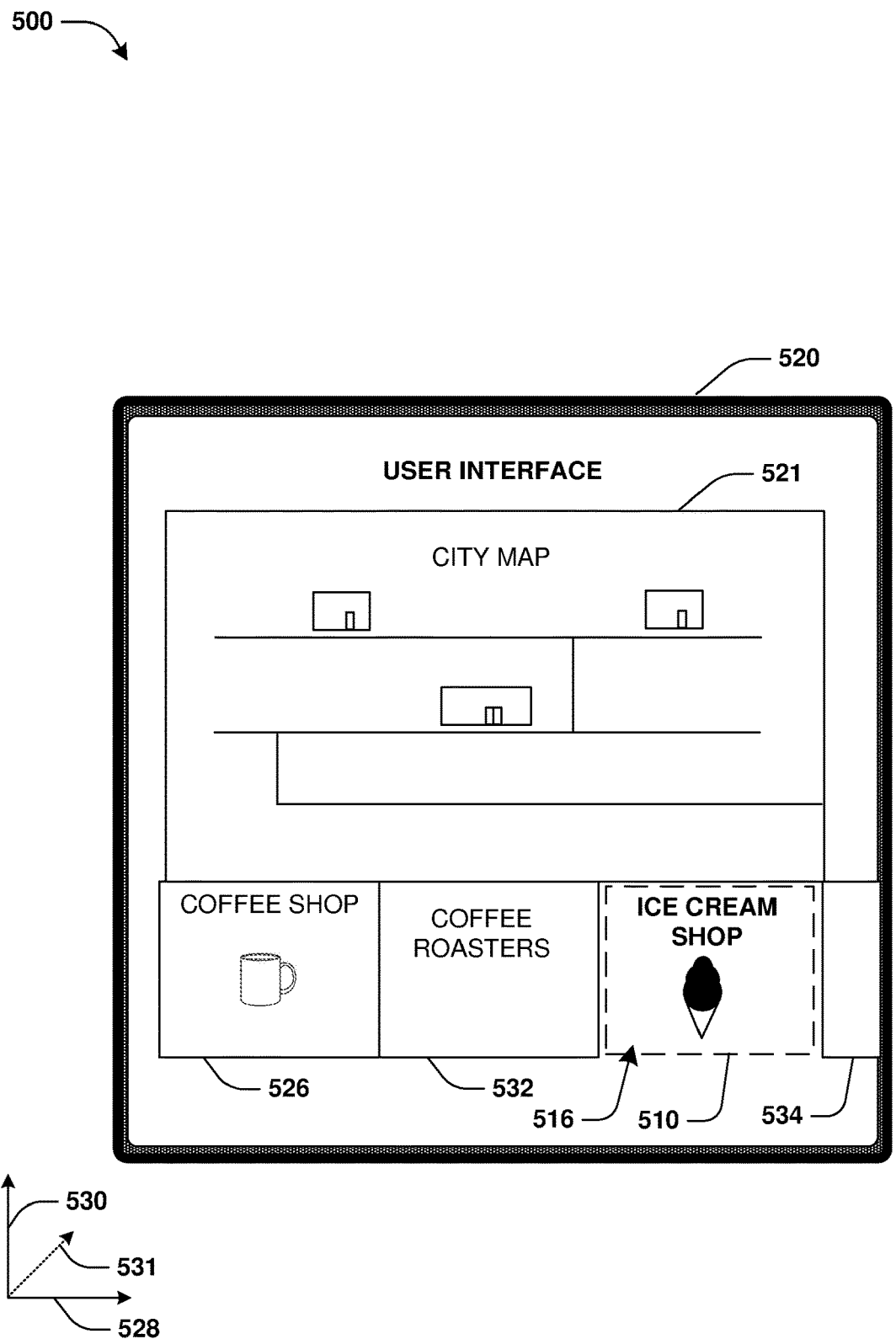
FIG. 5D is a component block diagram illustrating an example system for layering content objects for a user interface, where a second content object is rendered.

FIG. 5D illustrates a second user input displacing the second search result 524, the third search result 526, and a fourth search result 532. For example, the user may swipe from right to left across the display along the x-axis 528 to move the second search result 524 off the display, and to move the third search result 526 and the fourth search result 532 to the left away from the horizontal and vertical position to which the set of layers is assigned, such as the bottom right corner of the user interface. A determination may be made that the second user input triggers the transition of the user interface to display the ice cream shop image content object 516 of the second layer 510 at the horizontal and vertical position. The second user input may trigger the transition based upon the second user input displacing the second search result 524, the third search result 526, and the fourth search result 532 a threshold distance from the horizontal and vertical position (e.g., user input that moves search results outside of the horizontal and vertical position). In this way, the ice cream shop image content object 516 is rendered at the horizontal and vertical position based upon navigation along the z-axis 531 from the first layer 508 to the second layer 510.

Figure 5E:
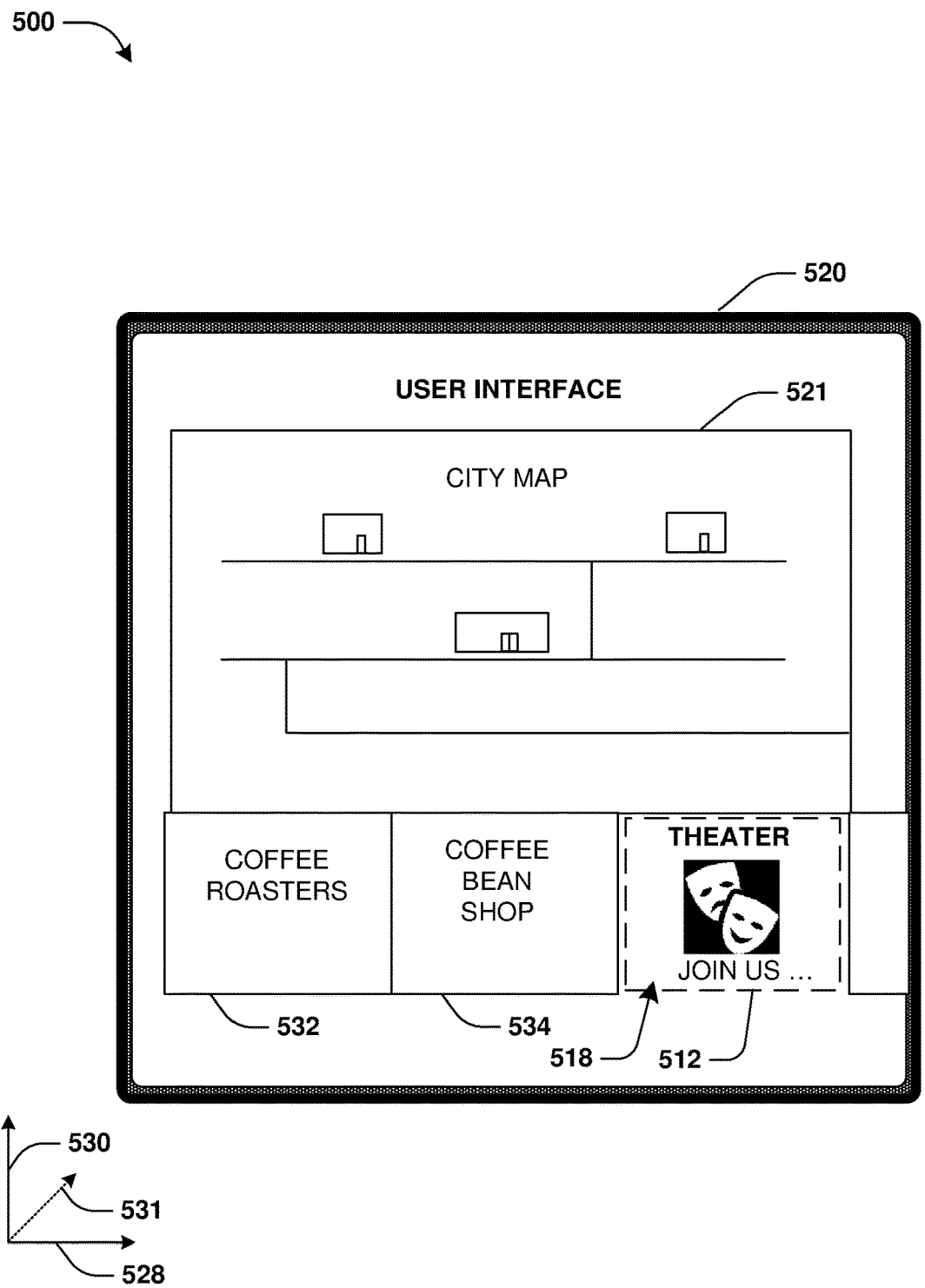
FIG. 5E is a component block diagram illustrating an example system for layering content objects for a user interface, where a third content object is rendered.

FIG. 5E illustrates a third user input displacing the third search result 526, the fourth search 532, and a fifth search result 534. For example, the user may swipe from right to left across the display along the x-axis 528 to move the third search result 526 off the display, and to move the fourth search result 532 and the fifth search result 534 to the left away from the horizontal and vertical position to which the set of layers is assigned, such as the bottom right corner of the user interface. A determination may be made that the third user input triggers the transition of the user interface to display the theater content object 518 of the third layer 512 at the horizontal and vertical position. The third user input may trigger the transition based upon the third user input displacing the third search result 526, the fourth search result 532, and the fifth search result 534 a threshold distance from the horizontal and vertical position (e.g., user input that moves search results outside of the horizontal and vertical position). In this way, the theater content object 518 is rendered at the horizontal and vertical position based upon navigation along the z-axis 531 from the second layer 510 to the third layer 512.

Figure 6:
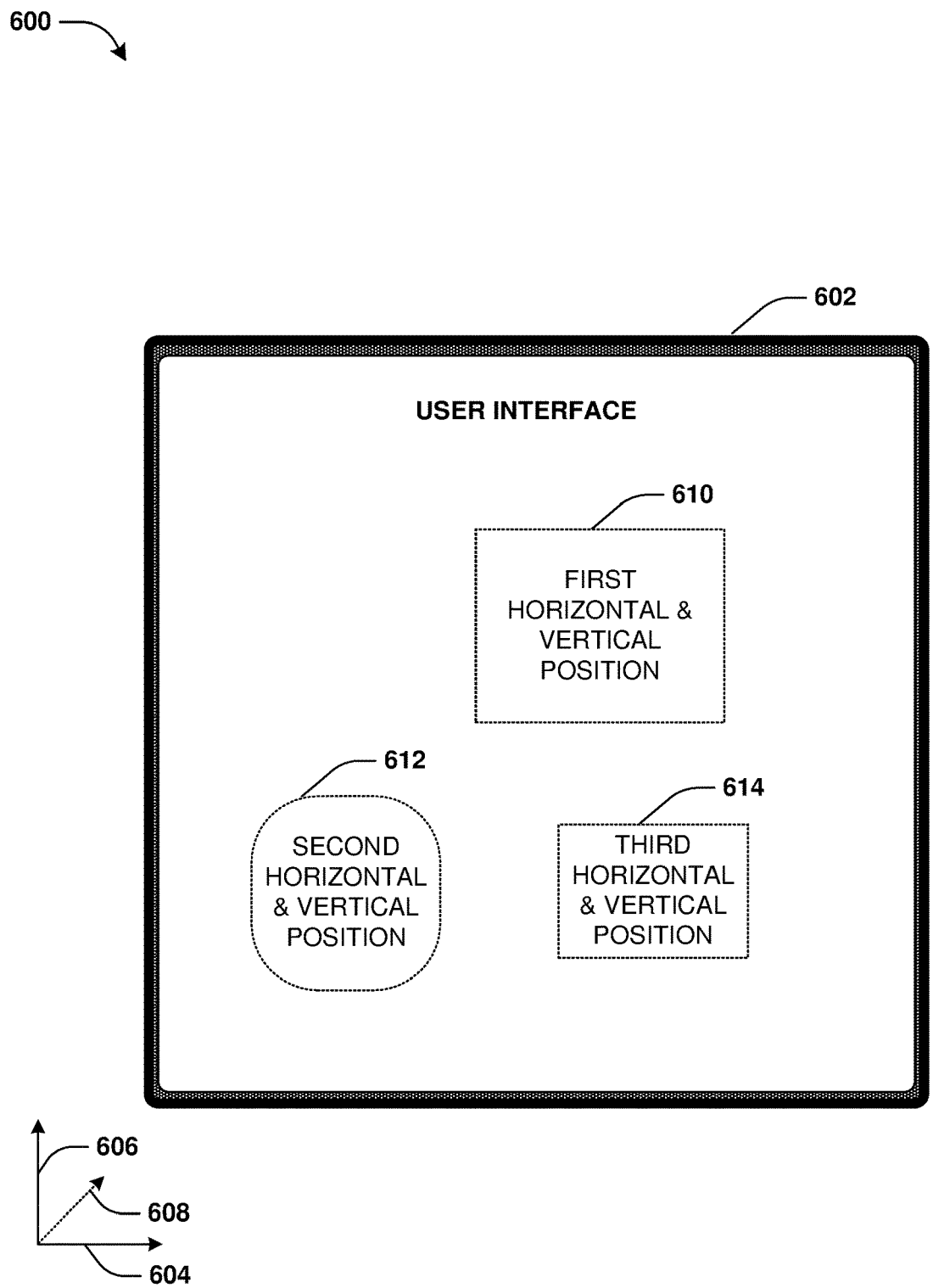
FIG. 6 is a component block diagram illustrating an example system for layering content objects for a user interface, where sets of layers are assigned to different regions of the user interface.

FIG. 6 illustrates an example of a system 600 for layering content objects for a user interface 602. The user interface 602 may be natively associated with an x-axis 604 and a y-axis 606. A z-axis 608 may be defined for the user interface 602. One or more regions, corresponding to horizontal and vertical positions, may be defined for the user interface 602. The one or more regions can have the same or different size and/or shape. The one or more regions can overlap or not overlap. In one example, a first region 610 is defined as a rectangle at a first horizontal and vertical position within the user interface 602. A second region 612 is defined as a circular shape at a second horizontal and vertical position within the user interface 602. A third region 614 is defined as a rectangle at a third horizontal and vertical position within the user interface 602. In this example, the regions do not overlap and the regions have different shapes and sizes.

Sets of layers may be assigned to each region. For example, 5 image content objects may be assigned to a first set of layers, 4 video content objects may be assigned to a second set of layers, and 3 hyperlink content objects may be assigned to a third set of layers. The first set of layers may be assigned to the first region 610 such that when user input displaces a currently rendered content object away from the first region 610, content objects of a layer below a currently displayed layer of the first set of layers is displayed within the first region 610. The second set of layers may be assigned to the second region 612 such that when user input displaces a currently rendered content object away from the second region 612, content objects of a layer below a currently displayed layer of the second set of layers is displayed within the second region 612. The third set of layers may be assigned to the third region 614 such that when user input displaces a currently rendered content object away from the third region 614, content objects of a layer below a currently displayed layer of the third set of layers is displayed within the third region 614.

Figure 7A:
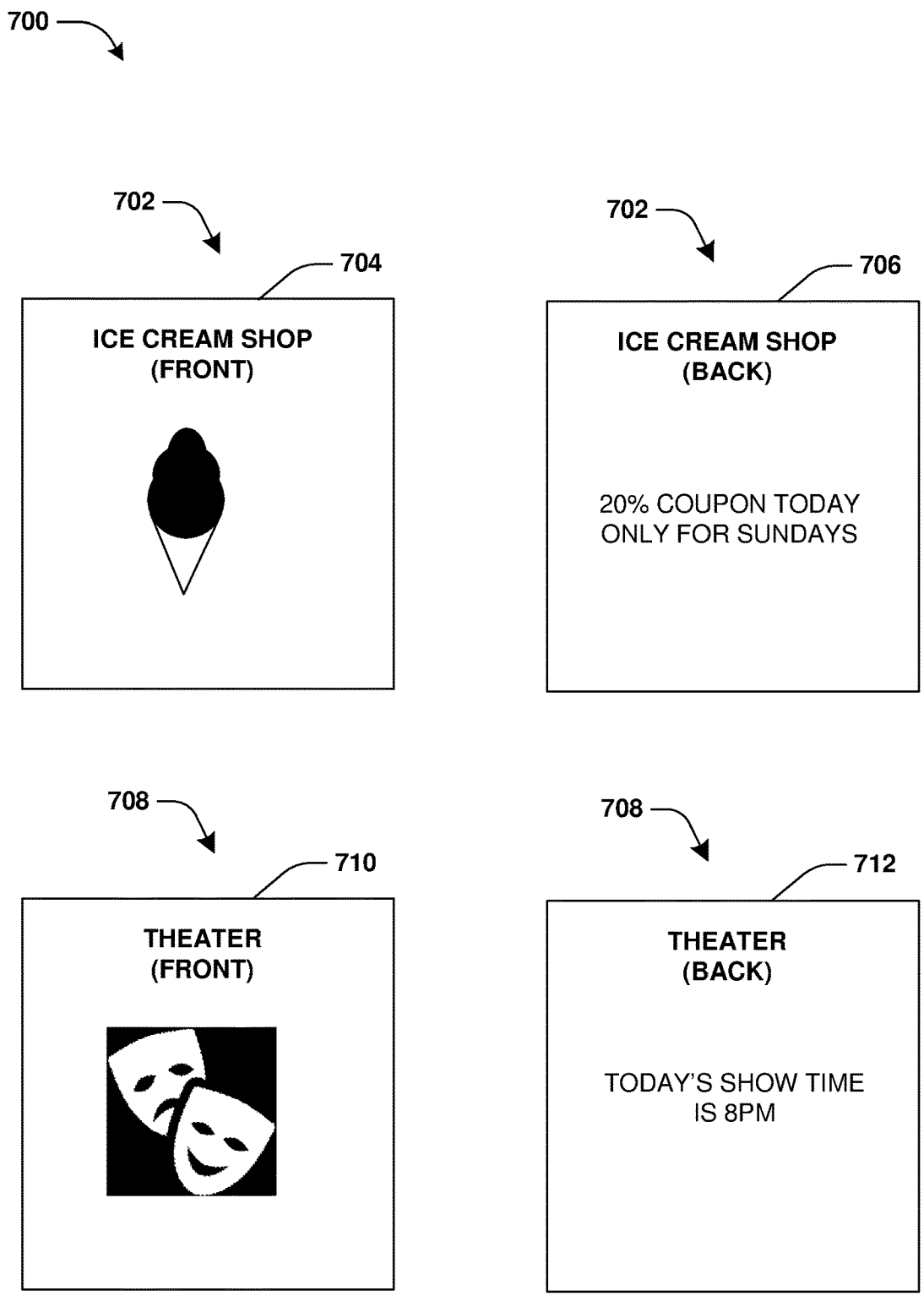
FIG. 7A is a component block diagram illustrating an example system for layering content objects for a user interface.

FIGS. 7A-7E illustrate an example of a system 700 for layering content objects for a user interface. A first content object 702 may comprise a front side 704 populated with content of an ice cream shop image, as illustrated by FIG. 7A. The first content object 702 may comprise a back side 706 populated with content of a coupon. A second content object 708 may comprise a front side 710 populated with content of a theater image. The second content object 708 may comprise a back side 712 populated with content of a show time. In this way, the content objects may represent virtual cards. The content objects may be assigned to layers within a set of layers. The first content object 702 may be assigned to a first layer, the second content object 708 may be assigned to a second layer, etc. The set of layers may be assigned to a horizontal and vertical position within the user interface, such as a lower right region of the user interface.

Figure 7B:
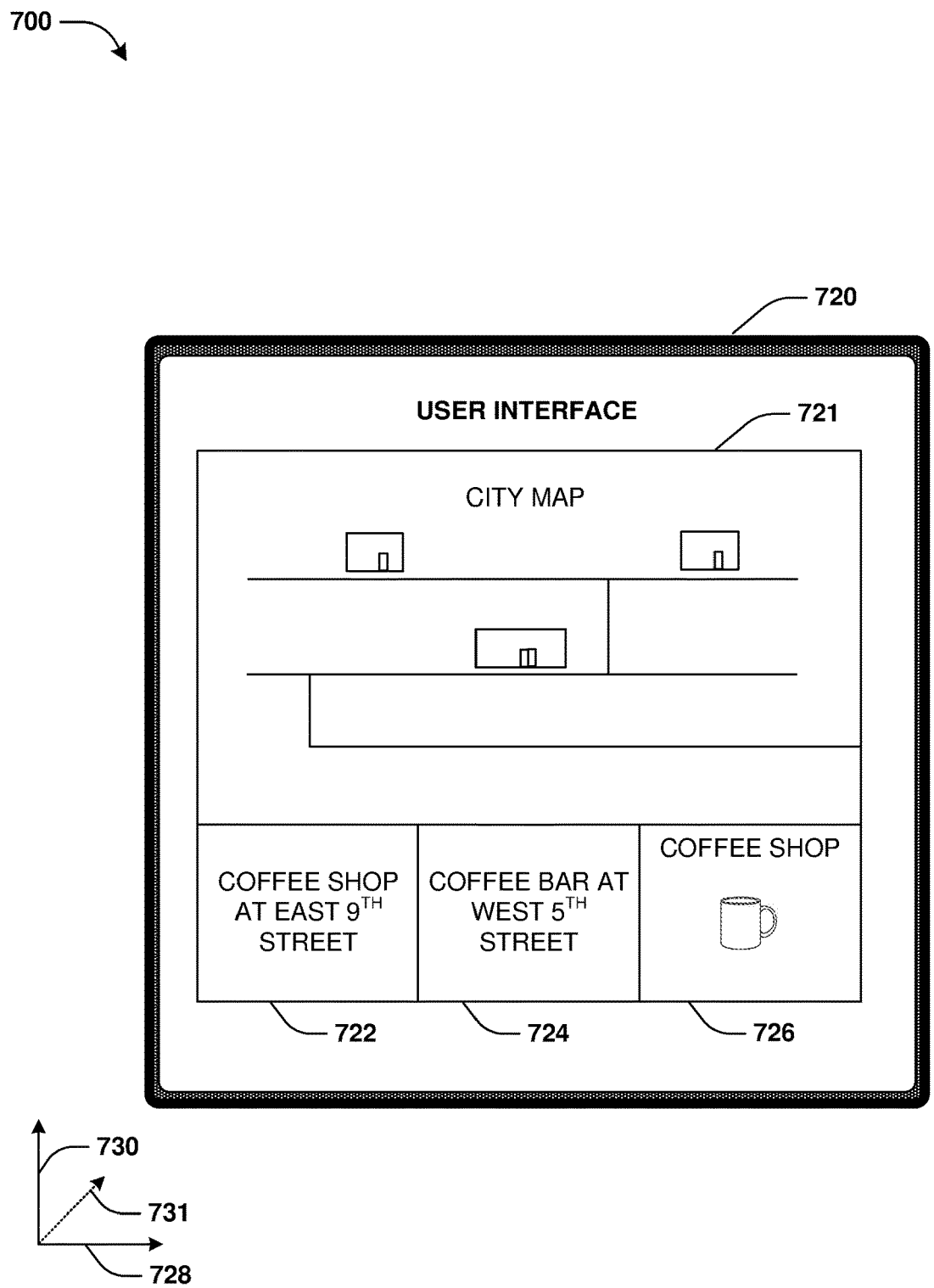
FIG. 7B is a component block diagram illustrating an example system for layering content objects for a user interface, where the user interface is rendered.

FIG. 7B illustrates the user interface being rendered through a display of a computing device 720. The user interface may be rendered with native user interface elements, such as a city map 721, a first search result 722, a second search result 724, and a third search result 726 for a query "coffee shops" submitted through the user interface. These native user interface elements may be referred to as currently displayed content objects because the native user interface elements are currently rendered and displayed through the display. The user interface may be associated with an x-axis 728 (e.g., a horizontal axis running horizontally along the user interface) and a y-axis 730 (e.g., a vertical axis running vertically along the user interface). A z-axis 731 may be defined for the user interface. The z-axis 731 may run into and out of the user interface and display. The search results may be displayed within a horizontal scroll interface along the x-axis 728 so that a user can scroll amongst the search results with left and right swipe gestures or other input.

Figure 7C:
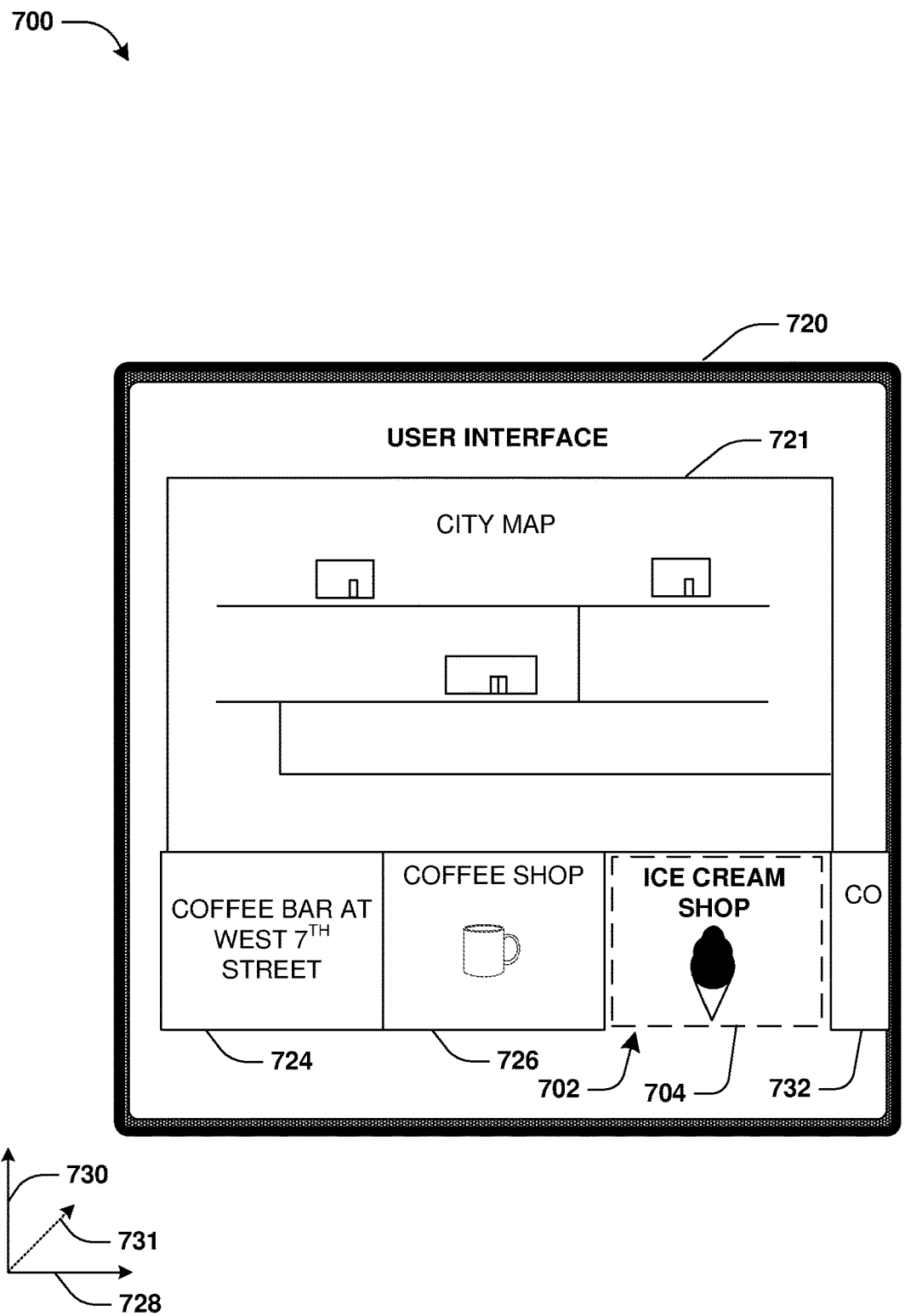
FIG. 7C is a component block diagram illustrating an example system for layering content objects for a user interface, where a front side of a content object is rendered.

FIG. 7C illustrates a first user input displacing the first search result 722, the second search result 724, and the third search result 726. For example, a user may swipe from right to left across the display along the x-axis 728 to move the first search result 722, the second search result 724, and the third search result 726 to the left away from the horizontal and vertical position to which the set of layers is assigned. A determination may be made that the first user input triggers the transition of the user interface to display the front side 704 of the first content object 702 of the first layer, such as the ice cream shop image. The first user input may trigger the transition based upon the first user input displacing the first search result 722, the second search result 724, and/or the third search result 726 a threshold distance from the horizontal and vertical position (e.g., user input that moves search results outside of the horizontal and vertical position). In this way, the front side 704 of the first content object 702 is rendered at the horizontal and vertical position based upon navigation along the z-axis 731 from a current layer to the first layer comprising the first content object 702.

Figure 7D:
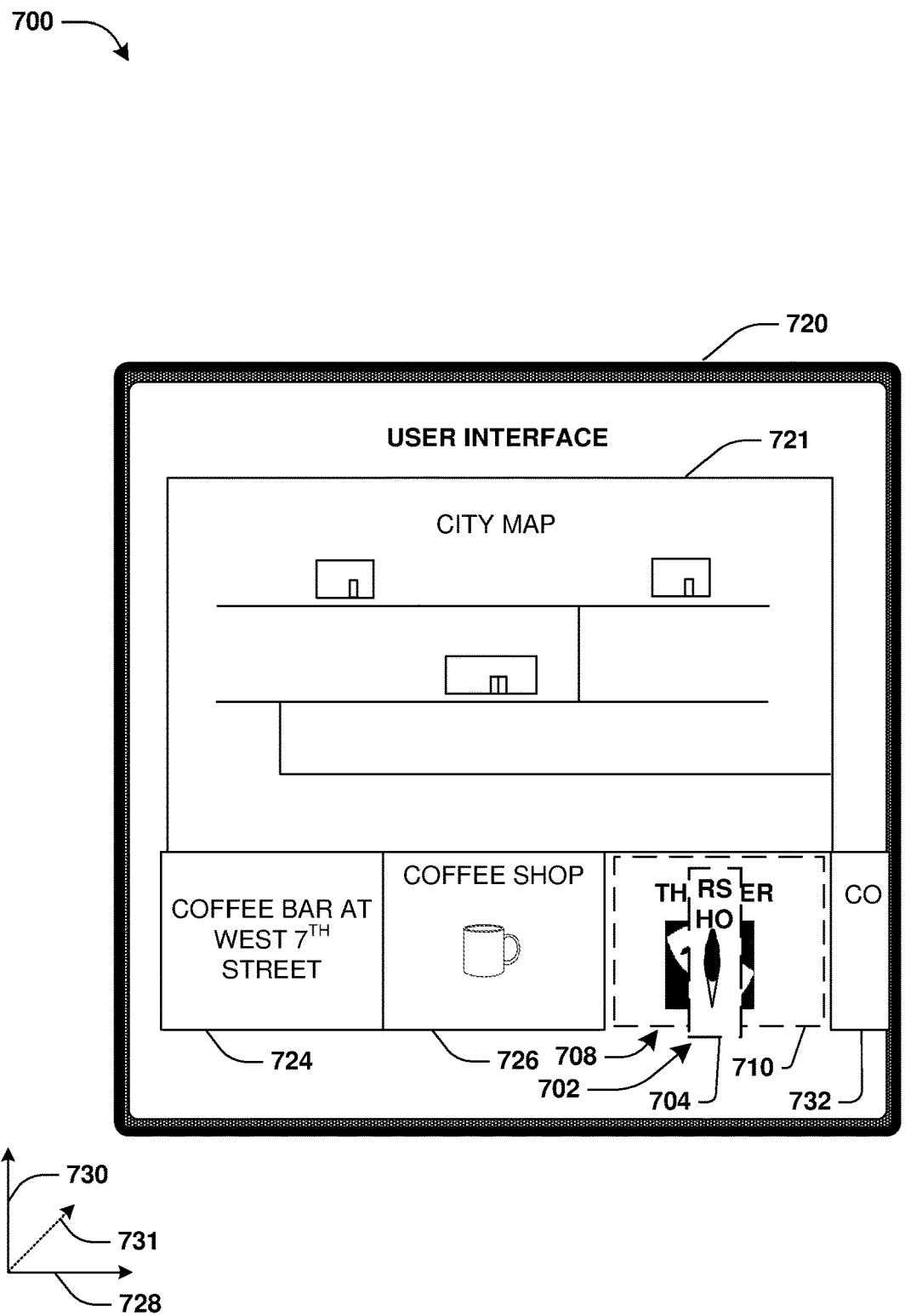
FIG. 7D is a component block diagram illustrating an example system for layering content objects for a user interface, where a content object is flipped.
Figure 7E:
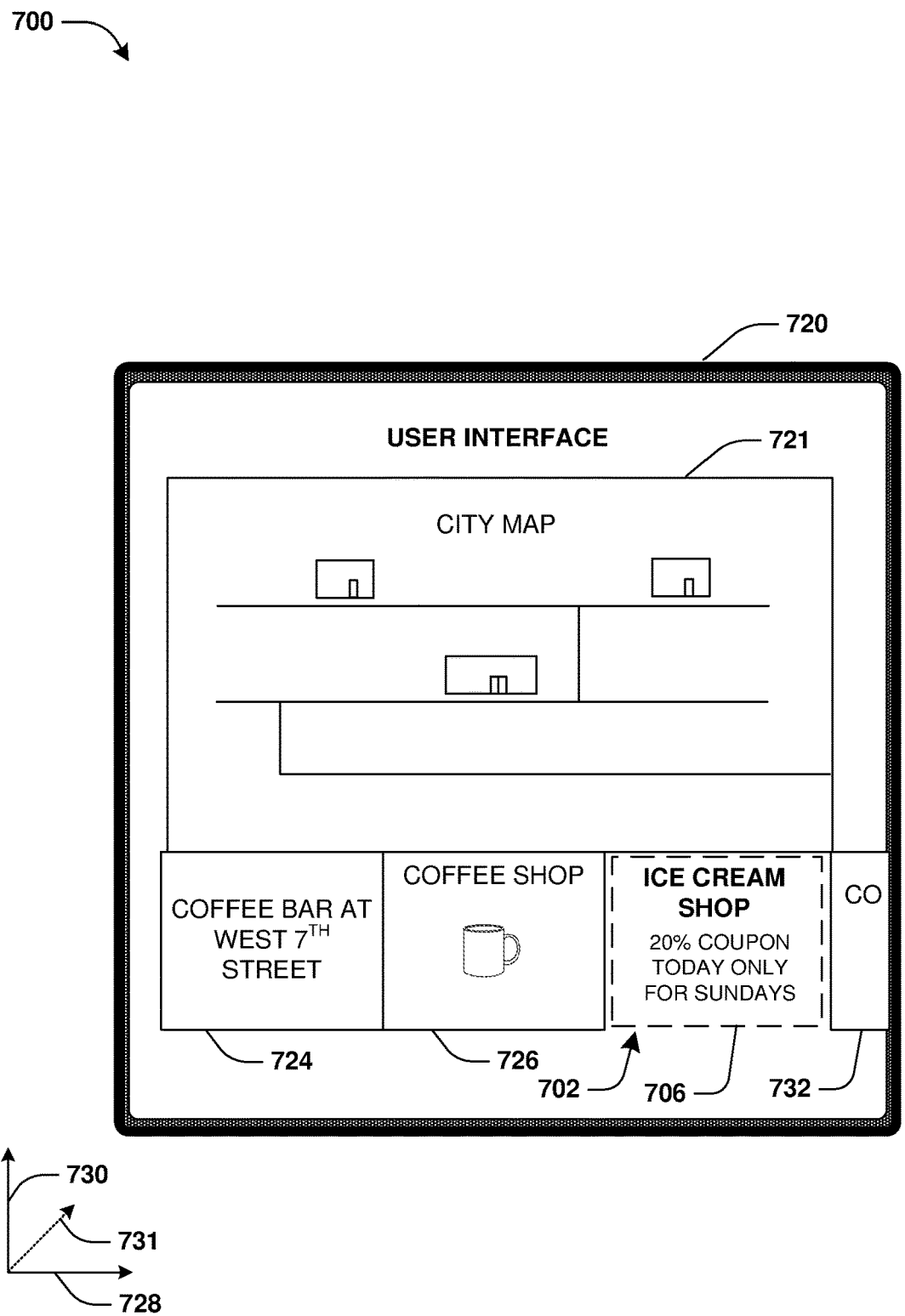
FIG. 7E is a component block diagram illustrating an example system for layering content objects for a user interface, where a back side of a content object is rendered.

FIG. 7D illustrates a second user input interacting with the front side 704 of the first content object 702. For example, the user may select, click, touch, or otherwise interact with the front side 704 of the first content object 702. Accordingly, a flip animation may be performed for the first content object 702 to flip the first content object 702 from the front side 704 to the back side 706. During the flip animation, the front side 710 of the second content object 708 may be displayed until the flip animation completes. FIG. 7E illustrates the flip animation completing such that the back side 706 of the first content object 702 is displayed.

Figure 7F:
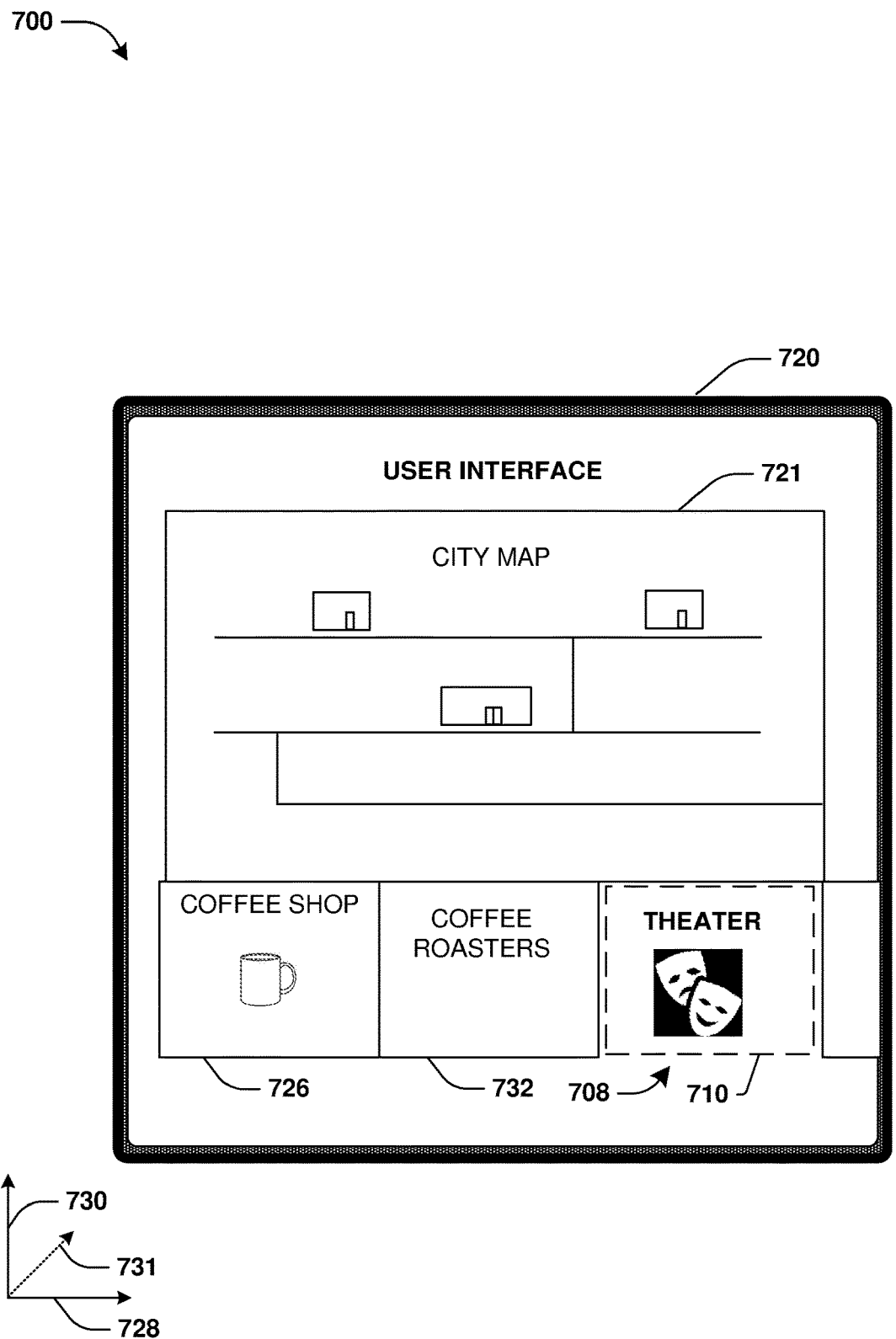
FIG. 7F is a component block diagram illustrating an example system for layering content objects for a user interface, where a second content object is rendered.

FIG. 7F illustrates a third user input displacing the second search result 724, the third search result 726, and a fourth search result 732. For example, the user may swipe from right to left across the display along the x-axis 728 to move the second search result 724 off the display, and to move the third search result 726 and the fourth search result 732 to the left away from the horizontal and vertical position to which the set of layers is assigned, such as the bottom right corner of the user interface. A determination may be made that the third user input triggers the transition of the user interface to display the front side 710 of the second content object 708 of the second layer at the horizontal and vertical position. The third user input may trigger the transition based upon the third user input displacing the second search result 724, the third search result 726, and/or the fourth search result 732 a threshold distance from the horizontal and vertical position (e.g., user input that moves search results outside of the horizontal and vertical position). In this way, the front side 710 of the second content object 708 is rendered at the horizontal and vertical position based upon navigation along the z-axis 731 from the first layer to the second layer comprising the second content object 708.

Figure 8:
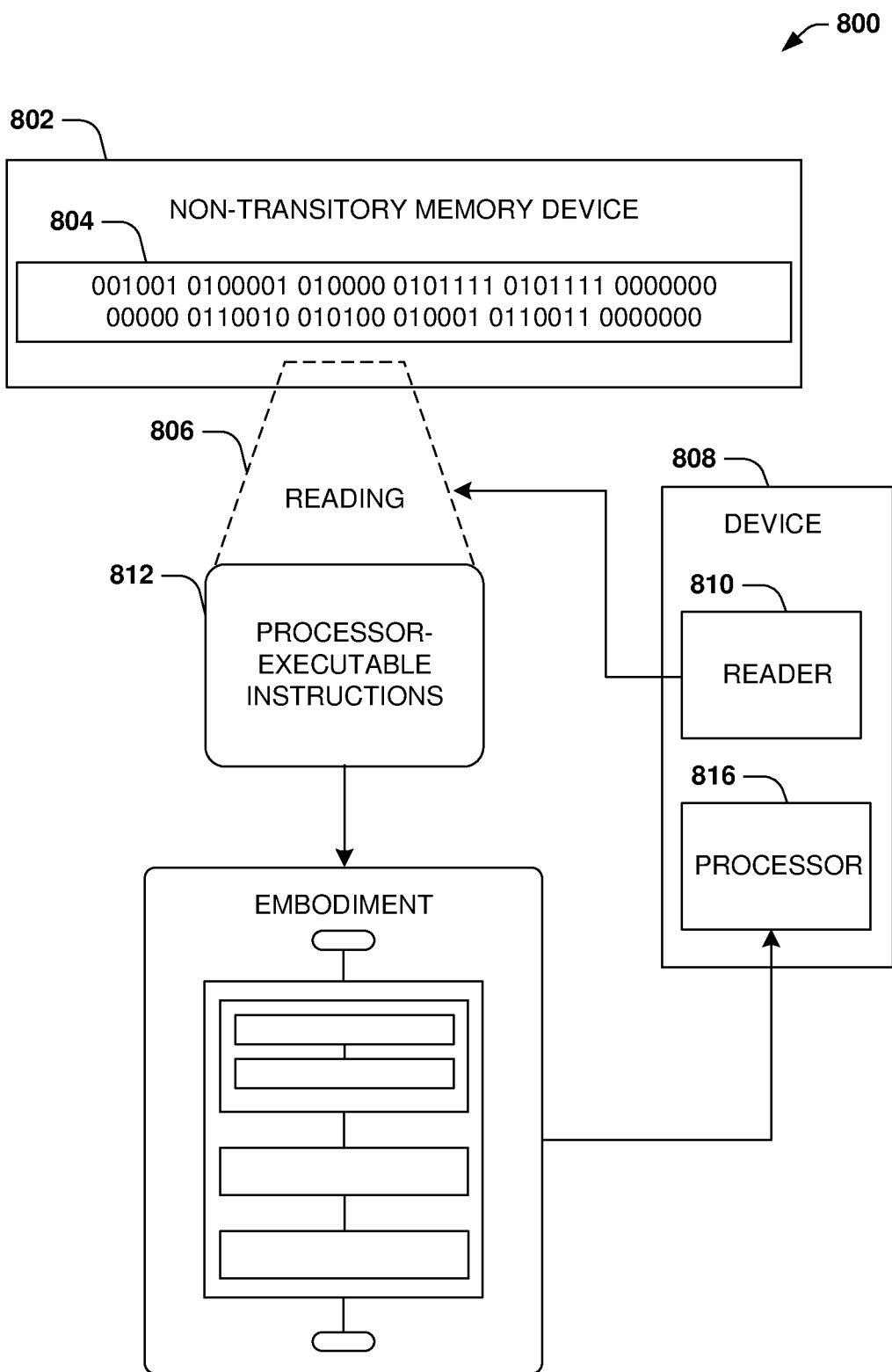
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system, such as at least some of the example system 500 of FIGS. 5A-5E, at least some of the example system 600 of FIG. 6, at least some of the example system 700 of FIGS. 7A-7F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of content object rendering, the method comprising:
executing, on a processor of a computing device, instructions that cause the computing device to perform operations, the operations comprising:
defining a z-axis for a user interface;
defining a set of layers positioned along the z-axis;
determining a set of content objects based upon a determination that the set of content objects have representations in a first map interface populated with location markers based upon a search performed using the user interface;
ranking the set of content objects based upon display criteria defining an ordering for which content objects are to be displayed, wherein the ranking comprises ranking a first content object higher than a second content object based upon the first content object more closely matching the search performed using the user interface than the second content object;
assigning one or more content objects of the set of content objects to layers of the set of layers according to an ordering derived from ranks assigned to the set of content objects;
rendering the user interface on a display of the computing device;
in response to receiving user input for a content object within a top layer, modifying the user interface to display the first content object within a first layer positioned below the top layer along the z-axis;
defining a bottom layer along the z-axis below the set of layers;
in response to receiving second user input comprising a swipe gesture in a first direction across at least some of a third content object, within a second layer, displayed in the user interface, modifying the user interface to transition from displaying the third content object to displaying a fourth content object within the bottom layer; and
in response to receiving third user input comprising a swipe gesture in the same first direction across at least some of the fourth content object within the bottom layer, modifying the user interface to transition from displaying the fourth content object to displaying the third content object within the second layer.

2. The method of claim 1, comprising:
in response to receiving fourth user input for a currently displayed content object, modifying the user interface to display the second content object within a third second layer below the first layer along the z-axis.

3. The method of claim 2, wherein the modifying the user interface to display the second content object comprises:
replacing the display of the first content object with the second content object.

4. The method of claim 1, comprising after the modifying the user interface to transition from displaying the fourth content object to displaying the content object within the top layer in response to receiving the third user input:
in response to receiving fourth user input comprising a swipe gesture in the first direction across at least some of the content object within the top layer, modifying the user interface to transition from displaying the content object to displaying the first content object within the first layer.

5. The method of claim 1, wherein the user input comprises a touch gesture displacing the content object away from a horizontal and vertical position of the first content object.

6. The method of claim 4, comprising after the modifying the user interface to transition from displaying the content object to displaying the first content object within the first layer:
in response to receiving fifth user input comprising a swipe gesture in the first direction across at least some of the first content object within the first layer, modifying the user interface to transition from displaying the first content object to displaying another content object within another layer positioned below the first layer along the z-axis.

7. The method of claim 1, comprising:
determining at least one of text associated with the user interface, an image associated with the user interface or metadata associated with the user interface.

8. The method of claim 7, comprising:
analyzing at least one of the text, the image or the metadata; and
identifying a context of the user interface based upon the analyzing.

9. A computing device comprising:
a processor; and
memory comprising processor-executable instructions that when executed by the processor cause performance of operations, the operations comprising:
defining a z-axis for a user interface;
defining a set of layers along the z-axis;
ranking a set of content objects, wherein the ranking comprises ranking a first content object higher than a second content object based upon the first content object being designated a transient content object and the second content object being designated a permanent content object;
assigning one or more content objects of the set of content objects to layers of the set of layers based upon the ranking;
rendering the user interface on a display of the computing device, wherein content objects within layers below a current layer are not displayed;
in response to receiving user input for a content object within the current layer, modifying the user interface to display the first content object within a first layer positioned below the current layer along the z-axis;
defining a bottom layer along the z-axis below the set of layers;
in response to receiving second user input comprising a swipe gesture in a first direction across at least some of a third content object, within a second layer, displayed in the user interface, modifying the user interface to transition from displaying the third content object to displaying a fourth content object within the bottom layer;
in response to receiving third user input comprising a swipe gesture in the same first direction across at least some of the fourth content object within the bottom layer, modifying the user interface to transition from displaying the fourth content object to displaying the third content object within the second layer; and
in response to receiving fourth user input comprising a swipe gesture in the same first direction across at least some of the third content object within the second layer, modifying the user interface to transition from displaying the third content object to displaying another content object within another layer positioned above the second layer along the z-axis.

10. The computing device of claim 9, wherein the operations comprise:
defining a second set of layers along the z-axis, wherein the set of layers correspond to a first horizontal and vertical position within the user interface and the second set of layers correspond to a second horizontal and vertical position within the user interface.

11. The computing device of claim 9, wherein the first content object being designated a transient content object corresponds to the first content object having a decreasing level of relevancy over a period of time and the second content object being designated a permanent content object corresponds to the second content object maintaining a level of relevancy over the period of time.

12. The computing device of claim 9, wherein the current layer comprises a first type of content object, the first layer comprises a second type of content object, and the second layer of the set of layers comprises a third type of content object.

13. The computing device of claim 12, wherein at least one of the first type of content object, the second type of content object or the third type of content object corresponds to at least one of a create calendar entry command interface, a post to social network command interface, a send email command interface or a video.

14. The computing device of claim 13, wherein the first type of content object is different than the second type of content object and the third type of content object, and the second type of content object is different than the third type of content object.

15. The computing device of claim 9, comprising:
ranking content objects for display along the z-axis of the user interface; and
ranking content objects for display along an x-axis of the user interface.

16. The computing device of claim 15, comprising:
ranking content objects for display along a y-axis of the user interface.

17. The computing device of claim 9, comprising:
rendering the user interface as an augmented reality user interface of a location, wherein the z-axis corresponds to a depth of the location.

18. A non-transitory machine readable medium having stored thereon processor-executable instructions that when executed cause performance of operations, the operations comprising:
defining a z-axis for a user interface;
determining a number of layers based upon a network bandwidth associated with the user interface;
defining a set of layers, with the number of layers, along the z-axis;
determining a set of content objects based upon at least one of a current location of a first device, a time of day, or a determination that the set of content objects have representations in a first interface;
ranking the set of content objects based upon display criteria defining an ordering for which content objects are to be displayed, wherein the ranking comprises one of:
ranking a first content object higher than a second content object based upon the first content object more closely matching a search performed using the user interface than the second content object; or
ranking the first content object higher than the second content object based upon the first content object being designated a transient content object and the second content object being designated a permanent content object;
assigning one or more content objects of the set of content objects to layers of the set of layers based upon the ranking;
rendering the user interface on a display of a computing device, wherein content objects within layers below a current layer are not displayed;
in response to receiving a first user input for a content object within the current layer, modifying the user interface to display the first content object within a first layer positioned below the current layer along the z-axis; and
in response to receiving a second user input for the first content object, modifying the user interface to display a flip animation of the first content object from a front side of the first content object to a back side of the first content object.

19. The non-transitory machine readable medium of claim 18, wherein the operations comprise:
during the flip animation, displaying at least a portion of the second content object within a second layer below the first layer.

20. The non-transitory machine readable medium of claim 19, wherein the operations comprise:
in response to receiving a third user input for the second content object while the back side of the first content object is displayed, modifying the user interface to display the second content object within the second layer in replace of the first content object.

* * * * *